United States Patent
Hamza et al.

(10) Patent No.: US 11,236,597 B2
(45) Date of Patent: Feb. 1, 2022

(54) DOWNHOLE CUSTOMIZATION OF FRACTURING FLUIDS FOR MICRO-FRACTURING OPERATIONS

(71) Applicant: Halliburton Energy Services, Inc., Houston, TX (US)

(72) Inventors: Syed Muhammad Farrukh Hamza, Tomball, TX (US); Anthony Van Zuilekom, Houston, TX (US); Loan Vo, Houston, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/493,425

(22) PCT Filed: Nov. 7, 2018

(86) PCT No.: PCT/US2018/059666
§ 371 (c)(1),
(2) Date: Sep. 12, 2019

(87) PCT Pub. No.: WO2020/096592
PCT Pub. Date: May 14, 2020

(65) Prior Publication Data
US 2021/0332681 A1    Oct. 28, 2021

(51) Int. Cl.
*E21B 43/26* (2006.01)
*E21B 49/10* (2006.01)
*E21B 49/08* (2006.01)

(52) U.S. Cl.
CPC .............. *E21B 43/26* (2013.01); *E21B 49/10* (2013.01); *E21B 49/0875* (2020.05)

(58) Field of Classification Search
CPC ....... E21B 43/26; E21B 49/10; E21B 49/0875
See application file for complete search history.

(56) References Cited

U.S. PATENT DOCUMENTS

| 5,303,775 A | * | 4/1994 | Michaels | ................ E21B 49/10 166/264 |
| 5,517,854 A | | 5/1996 | Plumb et al. | |

(Continued)

FOREIGN PATENT DOCUMENTS

WO    WO 2018/022079 A1    2/2018

OTHER PUBLICATIONS

Carnegie et al., "An Advanced Method of Determining Insitu Reservoir Stresses: Wireline Conveyed Micro-Fracturing", Society of Petroleum Engineers, Jan. 1, 2002.

(Continued)

*Primary Examiner* — Steven A MacDonald
(74) *Attorney, Agent, or Firm* — Haynes and Boone, LLP

(57) ABSTRACT

System and methods for customizing fracturing fluids downhole for real-time optimization of micro-fracturing operations are provided. Downhole operating conditions are monitored during a micro-fracturing operation along a portion of a wellbore within a subterranean formation, based on downhole measurements collected by sensors of a downhole formation tester. Injection parameters for a fracturing fluid to be injected from a bulk storage chamber of the downhole formation tester into the subterranean formation are determined based on the downhole operating conditions. Signals for customizing the fracturing fluid using one or more fluid additives stored within corresponding fluid storage chambers of the downhole formation tester are transmitted to a controller of the downhole formation tester, based on the injection parameters. Injection of the customized fracturing fluid from the downhole formation tester into an area of the subterranean formation surrounding the portion of the wellbore is controlled during the micro-fracturing operation.

20 Claims, 6 Drawing Sheets

(56) References Cited

U.S. PATENT DOCUMENTS

| | | | |
|---|---|---|---|
| 8,397,817 B2* | 3/2013 | Edwards | E21B 49/10 |
| | | | 166/308.1 |
| 8,408,296 B2* | 4/2013 | Edwards | E21B 47/06 |
| | | | 166/250.1 |
| 9,176,245 B2* | 11/2015 | Craig | E21B 43/26 |
| 9,477,002 B2* | 10/2016 | Miller | E21B 43/26 |
| 9,574,443 B2* | 2/2017 | Walters | E21B 49/008 |
| 10,883,365 B2* | 1/2021 | Naveena-Chandran | |
| | | | E21B 49/10 |
| 10,982,539 B2* | 4/2021 | Khan | E21B 49/10 |
| 2006/0155473 A1 | 7/2006 | Soliman et al. | |
| 2010/0157737 A1* | 6/2010 | Miller | G01V 1/46 |
| | | | 367/117 |
| 2012/0043080 A1 | 2/2012 | Edwards | |
| 2015/0167442 A1 | 6/2015 | Harfoushian | |
| 2016/0265330 A1 | 9/2016 | Mazrooee et al. | |
| 2017/0292359 A1 | 10/2017 | Irani et al. | |
| 2019/0145252 A1* | 5/2019 | Naveena-Chandran | |
| | | | E21B 49/10 |
| | | | 166/250.17 |
| 2019/0153860 A1* | 5/2019 | Khan | E21B 49/10 |

OTHER PUBLICATIONS

International Search Report and Written Opinion issued for International Patent Application No. PCT/US2018/059666, dated Aug. 5, 2019, 9 pages.

* cited by examiner

DOWNHOLE CUSTOMIZATION OF FRACTURING FLUIDS FOR MICRO-FRACTURING OPERATIONS

CROSS-REFERENCE TO RELATED APPLICATION

The present application is a U.S. National Stage patent application of International Patent Application No. PCT/US2018/059666, filed on Nov. 7, 2018, the benefit of which is claimed and the disclosure of which is incorporated herein by reference in its entirety.

FIELD OF THE DISCLOSURE

The present disclosure relates generally to formation testing with downhole fluid samples and, particularly, to micro-fracturing techniques for downhole fluid sampling and formation testing.

BACKGROUND

Micro-fracturing operations may be used to test a subterranean formation prior to initializing a full-scale hydraulic fracture treatment of the subterranean formation. Such operations may be performed in, for example, an open hole wellbore by injecting a small quantity of fracturing fluid into an area of the surrounding formation to create a small-scale fracture (or "micro-fracture") within the formation. After a sufficiently long fracture is created in the subterranean formation, the fracturing operations are stopped and properties of the newly created fracture and the surrounding formation are analyzed as the fracture closes.

A micro-fracturing operation may be performed using a downhole formation tester coupled to a tool string disposed within the wellbore. Such a downhole tool may be used not only to deliver fracturing fluid from the surface for injection into the formation downhole, but also to hold fluid samples collected from the formation for testing at the surface. Conventional formation testing techniques for micro-fracturing operations generally involve either pumping fracturing fluid downhole from a fluid repository located at the surface via the formation-testing tool or filling a bulk storage chamber of the tool with pre-formulated fracturing fluid at the surface and lowering the tool into the wellbore for injecting the fluid downhole, or pumping the fluid present within the wellbore, usually after filtering it.

DESCRIPTION OF ILLUSTRATIVE EMBODIMENTS

Figure 1:
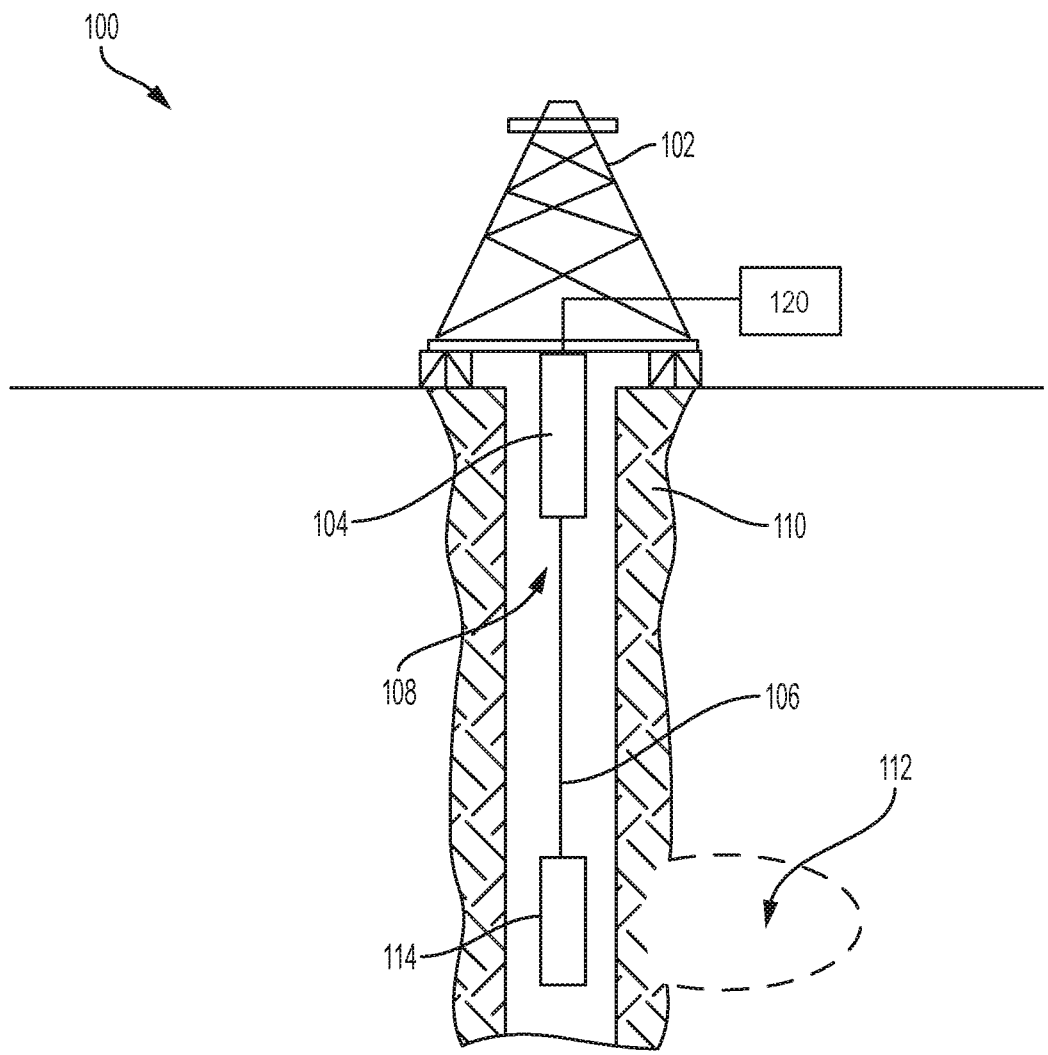
FIG. 1 is a diagram of an illustrative well system for performing micro-fracturing operations within a hydrocarbon bearing reservoir formation.

Embodiments of the present disclosure relate to downhole customization of fracturing fluids for real-time optimization of micro-fracturing operations within a subterranean hydrocarbon bearing formation. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to make real-time operating decisions regarding the type and composition of fluids to be injected into a reservoir formation during a micro-fracturing operation performed over different portions or depth intervals along a wellbore drilled within the formation. In one or more embodiments, a fracturing fluid along with a variety of fluid additives may be carried downhole in separate fluid storage chambers of a downhole formation tester. The downhole formation tester may also include fluid sample collection chambers to hold samples of reservoir fluids collected from the formation, e.g., for delivery to a processing facility at the surface. Examples of different types of fluid additives that may be stored within fluid storage chambers of the downhole formation tester include, but are not limited to, proppant, breaker fluids, friction reducer, oxidizing agent, acid, corrosion inhibitor, anti-bacterial agent, scale inhibitor, surfactant, gelling agent, crosslinker, salt, clay control agent, polymers and any other type of downhole fluid that may be injected during the course of the micro-fracturing operation.

In one or more embodiments, the fluid additives may be used to customize the fracturing fluid downhole based on current operating conditions, e.g., based on measurements of rock properties and other downhole conditions within the wellbore and surrounding formation as collected by sensors of the downhole formation tester during the micro-fracturing operation along the wellbore. For example, one or more fluid additives may be used to appropriately modify the composition and properties of the fracturing fluid so as to optimize the micro-fracturing operation according to the operating conditions encountered downhole. In some implementations, the customization or modification of fracturing fluid properties may be performed by mixing or combining a portion of the fracturing fluid with appropriate amounts of the fluid additive(s), e.g., within a mixing chamber of the downhole formation tester, so as to vary the composition and properties of the fracturing fluid as desired for a particular stage of the micro-fracturing operation. For example, a breaker fluid may be used to control the viscosity and/or elasticity of the fracturing fluid at some point before, during, or after a main fracturing fluid injection stage of the operation. Additionally or alternatively, various polymers, cross-linkers, breaker fluids, gel stabilizers, or any combination thereof may be used to modify certain properties of the fracturing fluid so as to improve its conductivity of proppant and its stability before or during a clean-up stage of the operation.

Illustrative embodiments and related methodologies of the present disclosure are described below in reference to FIGS. 1-7 as they might be employed in, for example, a computer system for downhole customization of fracturing fluids during micro-fracturing and fluid sampling operations within a subsurface formation. Such a computer system may use sensor data to determine current operating conditions and customize the downhole fluids to be injected accordingly. By accounting for changing operating conditions as they occur, such downhole customization of fluids allows the micro-fracturing operations to be optimized in real-m time for both conventional and unconventional reservoir formations. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an illustrative well system 100 for performing a micro-fracturing operation within a hydrocarbon bearing reservoir formation. In the example of FIG. 1, well system 100 includes a derrick 102 positioned at a surface 104 of a wellbore 108 drilled into a subterranean formation 110. Wellbore 108 may include a cased or uncased/open hole or a combination of cased and uncased portions. Although wellbore 108 is shown in FIG. 1 as a vertical wellbore, it should be appreciated that embodiments are not limited thereto and that well system 100 may be equally well suited for use in wellbores having other orientations, including horizontal wellbores, multilateral wellbores, slanted wellbores, curved wellbores, or any combination thereof. Subterranean formation 110 may include a reservoir 112 of hydrocarbon deposits, e.g., oil and natural gas, as well as other fluids, e.g., water, or other types of natural resources trapped within the formation. In some cases, subterranean formation 110 may be a tight formation that includes low permeability rock (e.g., shale, coal, and/or others). Thus, reservoir 112 within subterranean formation 110 may be considered an "unconventional" reservoir. However, it should be appreciated that embodiments of the present disclosure are not intended to be limited thereto and that well system 100 may be equally well suited for use in conventional reservoirs in other types of subsurface rock formations. Such rock formations may include naturally fractured rock in addition to rock that has not been fractured to any significant degree.

In one or more embodiments, derrick 102 (or components thereof) may be used to raise and lower a downhole formation tester 114 into wellbore 108 via a wireline 106. For example, derrick 102 may include a tubing string 104 that mechanically connects to wireline 106 and supports downhole formation tester 114 within wellbore 108. As will be described in further detail below, downhole formation tester 114 may be used to customize a fracturing fluid downhole before it is injected into formation 110 during the micro-fracturing operation along wellbore 108. In one or more embodiments, the customization of fracturing fluid may be based on current operating conditions, e.g., as measured by one or more sensors (not shown) coupled to or integrated within downhole formation tester 114. Such sensors may be associated with, for example, measurement-while-drilling (MWD) or logging-while-drilling (LWD) tools coupled to downhole formation tester 114. While downhole formation tester 114 in this example is described as a wireline formation testing tool, it should be appreciated that the disclosed downhole fluid customization techniques are not intended to be limited thereto and that these techniques may be applied using formation testing tools having any of various downhole tool configurations for different conveyance techniques, e.g., pipe, tractor, slick line, etc., as desired for a particular implementation.

During micro-fracturing operations, downhole formation tester 114 may be used to create a small fracture (or "micro-fracture") in an area of subterranean formation 110 near reservoir 112 for purposes of collecting a reservoir fluid sample from the formation. The size of the fracture may be small enough to maintain the stability of wellbore 108 without causing any unintended fractures or collapse of an uncased portion of wellbore 108. The fracture may include a fissure or crevice in subterranean formation 110 that functions as a flow pathway for fluids from reservoir 112 to flow toward wellbore 108. Different components of downhole formation tester 114 may be used to create the fracture and collect the samples of reservoir fluid that flow into wellbore 108.

In one or more embodiments, the fluid customization, injection and sampling functions of downhole formation tester 114 may be controlled by a control system 120 located at the surface of subterranean formation 110. For example, control system 120 may send commands or instructions to downhole formation tester 114 via wireline 106 for invoking the appropriate functions over the course of the micro-fracturing operation. Control system 120 may also receive real-time information, e.g., sensor data relating to current operating conditions, collected by downhole formation tester 114 during the operation. Control system 120 may be any type of computing device including at least one processor and a memory. Such a computing device may include, for example and without limitation, a desktop computer, a laptop computer, a workstation, a server, a mobile device such as a smartphone or tablet computer. It should be appreciated that, while not shown in FIG. 1, control system 120 may include any of various components or subcomponents for performing the disclosed downhole fluid customization techniques and functions associated with the micro-fracturing operation. For example, control system 120 may include any number of computing subsystems, communication subsystems, pumping subsystems, monitoring subsystems, and/or other features as desired for a particular implementation.

Figure 2:
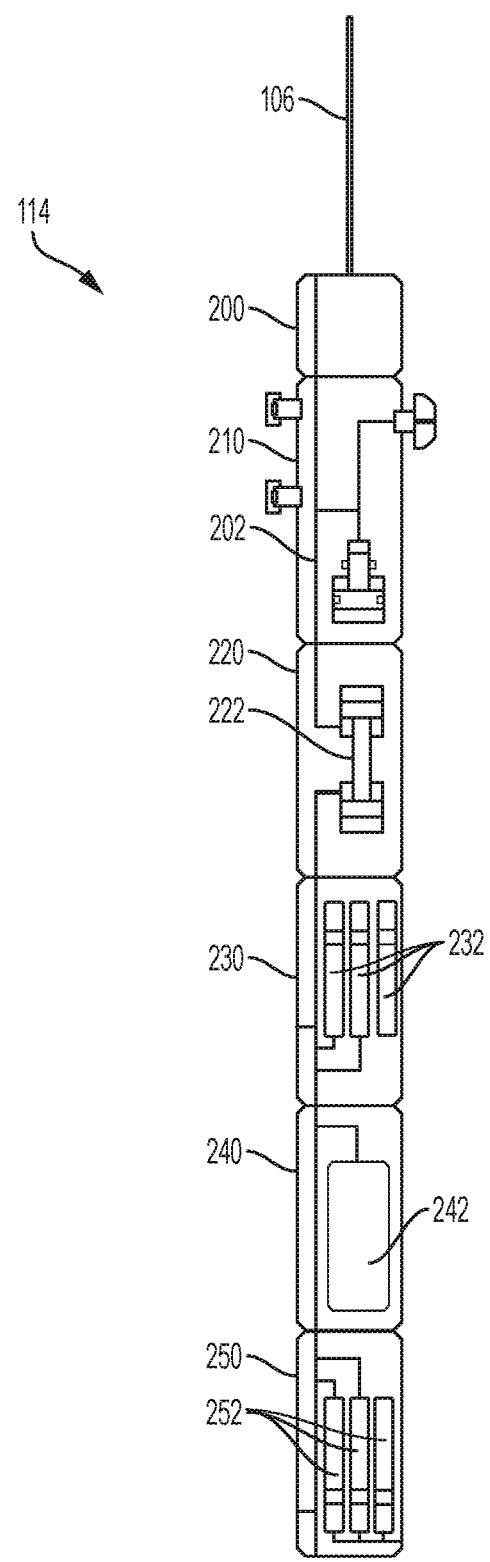
FIG. 2 is a diagram of an illustrative downhole formation tester of the well system shown in FIG. 1.

FIG. 2 is a cross-sectional schematic of downhole formation tester 114 of well system 100 shown in FIG. 1. As described above, downhole formation tester 114 may be conveyed via wireline 106 into a wellbore, e.g., wellbore 108, for performing a micro-fracturing operation within a subterranean formation. The micro-fracturing operation may include injecting a fracturing fluid into the formation to create a small test fracture within an area of the formation near a hydrocarbon reservoir as well as collecting a sample of reservoir fluid flowing from the formation into the wellbore as a result of the test fracture. In one or more embodiments, downhole formation tester 114 may be a modular downhole tool with various modules corresponding to different sections of the tool. In some implementations, each tool section may be used to provide a particular function or set of functions associated with the micro-fracturing operation, e.g., as part of a micro-fracturing system of downhole formation tester 114.

As shown in the example of FIG. 2, downhole formation tester 114 may include a downhole controller section 200, a pumping section 210, a flow control section 220, a fluid additive section 230, a fracturing fluid section 240, and a sample collection section 250. However, it should be appreciated that embodiments of the present disclosure are not intended to be limited thereto and that downhole formation tester 114 may include any of various sections and corresponding modules in addition to or in place of those shown in FIG. 2. Furthermore, the various sections and modules of downhole formation tester 114 may be interchangeable with other sections/modules (not shown), which may provide a different set of functions for the particular micro-fracturing operation being performed. For example, formation tester 114 may also include a straddle packer section that provides borehole isolation using two or more packers. In some implementations, downhole formation tester 114 may be assembled to include only those sections necessary to complete the intended operation. Further, it should be appreciated that the disclosed embodiments are not limited to the particular order of sections as shown in FIG. 2 and that the sections of downhole formation tester 114 may be reordered or rearranged in any of various ways as desired for a particular implementation or tool configuration. In some aspects, the wireline 106 may include conductors for carrying electricity from the surface 104 to power the various sections of the downhole formation tester 114. Thus, downhole formation tester 114 may include, for example, an additional section with a power module (not shown) for converting electricity received from the surface via wireline 106 into hydraulic power for use by the different sections within downhole formation tester 114.

In one or more embodiments, downhole controller section 200 may coordinate with a surface control system, e.g., control system 120 of FIG. 1, as described above, along with other sections of downhole formation tester 114 to manage and control various fluid injection and sampling operations as part of the overall micro-fracturing operation within the formation. For example, downhole controller section 200 may receive appropriate instructions or commands, e.g., in the form of control signals, relating to such operations from the surface control system via wireline 106. Downhole controller section 200 may then communicate with one or more of pumping section 210, flow control section 220, fluid additive section 230, fracturing fluid section 240, and sample collection section 250 to perform the particular operation according to the received instructions or commands. In some implementations, downhole controller section 200 may include a telemetry or communication device with a signaling subsystem that interfaces with the surface control system via wireline 106 and also provides electrical and data communication to and from the other sections of downhole formation tester 114. In one or more embodiments, the communication device of downhole controller section 200 may communicate with a sensor array, including one or more sensors (not shown) coupled to the downhole formation tester 114, for measuring characteristics of the formation and reservoir fluid samples collected from the formation.

Pumping section 210, flow control section 220, breaker fluid section 230, fracturing fluid section 240, and sample collection section 250 may be hydraulically connected to one another via a feedline 202 that extends through each of these sections. In one or more embodiments, feedline 202 may be used to route fluids between different sections within downhole formation tester 114 as well as between downhole formation tester 114 and the wellbore. For example, a fluid regulator 222 of flow control section 220 may use feedline 202 to route fracturing fluid from a bulk storage chamber 242 of fracturing fluid section 240 to a pumping device within pumping section 210 for generating the test fracture in the subterranean formation. Likewise, fluid regulator 222 may use feedline 202 to route proppant or other fluid additives (e.g., breaker fluid) from fluid storage chambers 232 of fluid additive section 230 to pumping section 210 for purposes of maintaining the test fracture, e.g., by propping the fracture open.

As will be described in further detail below, one or more of the fluid additives from fluid storage chambers 232 may be used to customize a portion of the fracturing fluid from bulk storage chamber 242 downhole based on current operating conditions, e.g., as measured by sensors of the downhole formation tester 114 during the micro-fracturing operation along the wellbore.

In some implementations, feedline 202 may also be used by fluid regulator 222 to route reservoir fluid samples collected by the pumping device of pumping section 210 from the fracture within the formation to fluid collection chambers 252 of sample collection section 250. However, it should be appreciated that embodiments are not intended to be limited thereto and that a separate feedline (not shown) within downhole formation tester 114 may be used for routing fluid samples collected from the formation. Furthermore, in some implementations, a separate pumping device within pumping section 210 or an additional pumping section that is separate from pumping section 210 within downhole formation tester 114 may be used for collecting and routing the fluid samples from the formation to sample collection section 250 for storage within fluid collection chambers 252.

While not shown in FIG. 2, it should be appreciated that fluid regulator 222 of flow control section 220 may include any of various pumps or valves operable in conjunction with the pumping device within pumping section 210 to allow fluid into and out of the downhole formation tester 114. Also, while not shown in FIG. 2, it should be appreciated that each of pumping section 210, fluid additive section 230, fracturing fluid section 240, and sample collection section 250 may include any of various pumps, valves or other flow control devices for routing fluids into and out of the respective fluid chambers or other components associated with that section.

Figure 3:
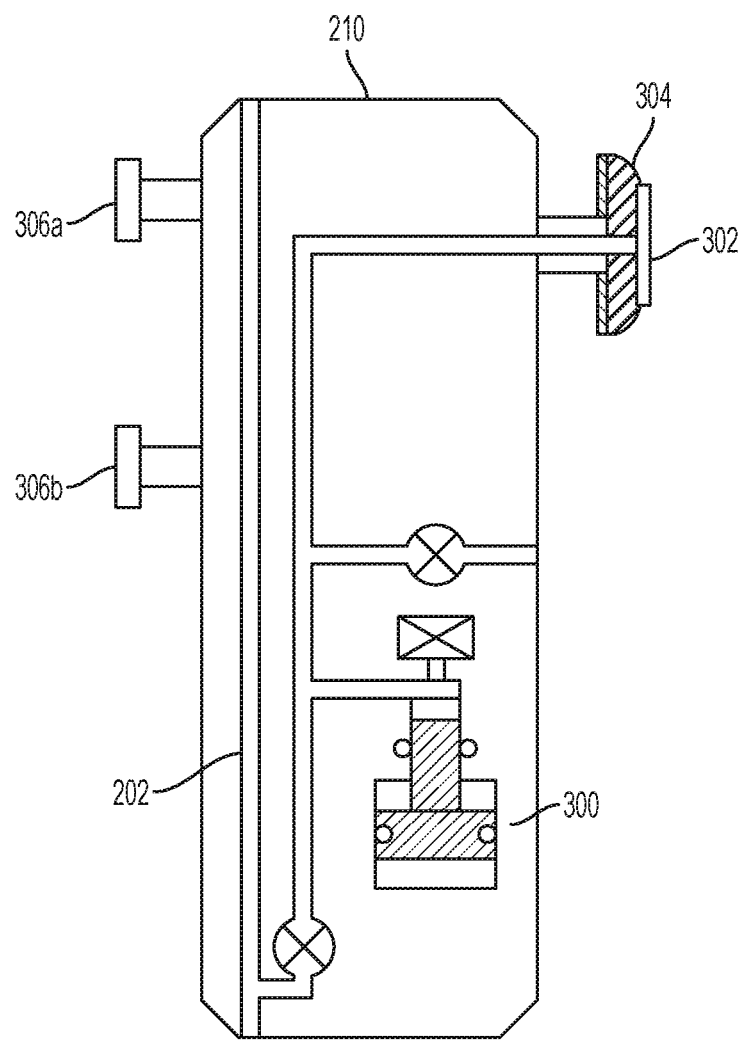
FIG. 3 is a diagram of an illustrative pump section of the downhole formation tester shown in FIG. 2.

FIG. 3 is a cross-sectional schematic of pumping section 210 of downhole formation tester 114 of FIG. 2. As shown in FIG. 3, pumping section 210 may include a pumping device 300, a nozzle 302, a sealing pad 304, and setting rams 306a and 306b. In one or more embodiments, pumping device 300 may be any of various pumps for pumping fluids into or out of downhole formation tester 114, as described above. Examples of such a pump include, but are not limited to, a reciprocating pump, a dual-acting pump, and a double-acting pump. For example, as a double-acting pump, pumping device 300 may be used to pump fracturing fluid from downhole formation tester 114 (e.g., from bulk storage chamber 242 of fracturing fluid section 240 of FIG. 2, as described above) into an area of the formation via nozzle 302 as well as to create a drawdown pressure to pump samples of formation fluid into the downhole formation tester 114 (e.g., into fluid collection chambers 252 of sample collection section 250 of FIG. 2) through nozzle 302.

In one or more embodiments, pumping device 300 may be coupled to various pumping components positioned within fluid regulator 222 of flow control section 220 of FIG. 2 via feedline 202. Such components may include, for example and without limitation, one or more dual-check valves for allowing different fluids to flow in multiple directions without allowing a particular fluid to flow into a section or fluid chamber designated for another fluid (e.g., allowing formation fluid to flow into bulk storage chamber 242 of fracturing fluid section 240 or fracturing fluid to flow into fluid collection chambers 252 of sample collection section 250).

In one or more embodiments, nozzle 302 may include one or more openings or channels that may serve as an inlet or outlet for fluids into and out of pumping section 210 of the downhole formation tester. In some implementations, nozzle 302 may be hydraulically connected to feedline 202 to allow fracturing fluid to be injected from the downhole formation tester (e.g., from bulk storage chamber 242 of fracturing fluid section 240 of FIG. 2, as described above) into an area of the surrounding formation (e.g., subterranean formation 110 of FIG. 1, as described above). The injected fluid may first combine with fluids in the wellbore (e.g., wellbore 108 of FIG. 1, as described above) before entering the formation.

In one or more embodiments, nozzle 302 may be surrounded by a sealing pad 304. Sealing pad 304 may be positioned around nozzle 302 and designed to make contact with the subterranean formation during fluid injection or sampling phases of the micro-fracturing operation. For example, sealing pad 304 may create suction to isolate an uncased wall of the subterranean formation. In some implementations, sealing pad 304 may be supported by a hydraulic piston to create the suction.

In one or more embodiments, setting rams 306a and 306b may extend from pumping section 210 to provide stability for the downhole formation tester during operation of pumping device 300. As shown in FIG. 3, setting rams 306a and 306b may be located on a side of pumping section 210 opposite to that of nozzle 302 and sealing pad 304. However, it should be appreciated that embodiments are not limited thereto and that setting rams be positioned at any of various locations along the exterior of pumping section 210. Also, while only setting rams 306a and 306b are shown in FIG. 3, it should be appreciated that any number of setting rams may be used as desired for a particular implementation. In one or more embodiments, actuators located inside the downhole formation tester may be used to extend and retract setting rams 306a and 306b during the micro-fracturing operation.

In one or more embodiments, pumping section 210 may further include one or more inlet or outlet probe mechanisms to perform a series of fluid injection tests for measuring various downhole operating conditions relating to the micro-fracturing operation parameters of the reservoir formation along a portion or depth interval of the wellbore. Such a probe mechanism may be, for example, a dual packer having inflatable rubber packers to isolate and test an area of the formation. Once an area of interest is isolated using the dual packer, pumping device 300 (or one or more pumps thereof) within pumping section 210 may be used to inject fracturing fluid into the formation area via one or more ports corresponding to fluid entry points or perforations along the wellbore. However, it should be appreciated that the formation may or may not fracture as a result of the fluid injected during each test. In addition to fracturing fluid, other types of fluids or fluid additives, for example, drilling fluid in the wellbore, water, filtered mud, completion fluid, or breaker fluid, may be injected into the area of interest until the injection pressure reaches a formation breakdown pressure value. The fluid injection may continue for any period of time that is sufficient to capture the fracture propagation pressure. Pumping device 300 may then be shut off to begin a pressure fall-off period. The fluid injection period yields useful reservoir parameters including, but not limited to, breakdown pressure and fracture propagation pressure, and the pressure fall-off period may provide the instantaneous shut-in pressure (ISIP), fracture closure pressure, initial reservoir pressure, and formation permeability properties.

Figure 4:
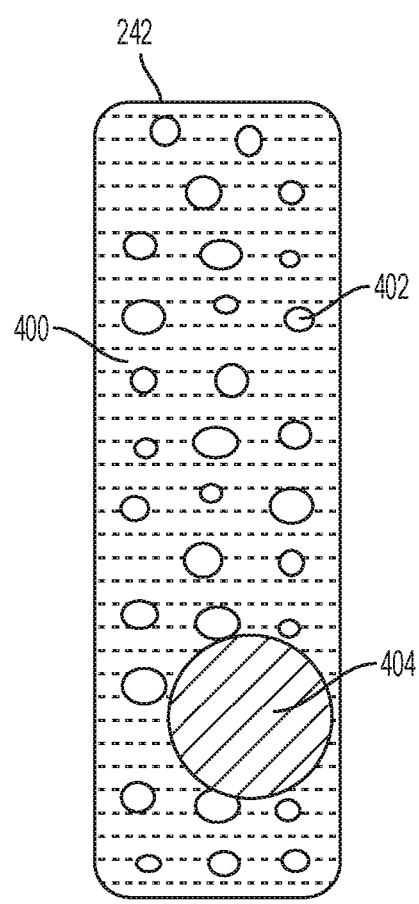
FIG. 4 is a diagram of an illustrative bulk storage chamber of a fracturing fluid section of the downhole formation tester shown in FIG. 2.

FIG. 4 is a diagram showing an example of bulk storage chamber 242 of fracturing fluid section 240 of downhole formation tester 114 of FIG. 2, as described above. Bulk storage chamber 242 may be used to store a fracturing fluid 400. Fracturing fluid 400 may be any suitable Newtonian or non-Newtonian fluid used for downhole fracturing operations to create a fracture in a subterranean formation adjacent to the wellbore. In one or more embodiments, bulk storage chamber 242 or a portion thereof may be used as a mixing chamber for combining or mixing a portion of fracturing fluid 400 with a fluid additive 402. Fluid additive 402 may be any of various fluid additives used to vary the composition and properties of fracturing fluid 400. Examples of such fluid additives include, but are not limited to, proppant, breaker fluids, friction reducer, oxidizing agent, acid, corrosion inhibitor, anti-bacterial agent, scale inhibitor, surfactant, gelling agent, crosslinker, clay control agent, polymers and any other type of downhole fluid that may be injected during the course of the micro-fracturing operation. In one or more embodiments, fluid additive 402 may be one of a variety of fluid additives stored within fluid storage chambers 232 of fluid additive section 230 of downhole formation tester 114, as shown in FIG. 2 and described above. While not shown in FIG. 4, bulk storage chamber 242 may include one or more smaller chambers for storing and mixing different quantities of fluid additive 402 with a predetermined amount of fracturing fluid 400.

In one or more embodiments, an agitation ball 404 may be employed to mix or stir fluid additive 402 within fracturing fluid 400. In some cases, agitation ball 404 may also be used to allow fluid additive 402 (e.g., proppant) to remain suspended in fracturing fluid 400 and without settling to the bottom of bulk storage chamber 242. Agitation ball 404 may be implemented using, for example, a rigid material, e.g., metal, to agitate fracturing fluid 400 within bulk storage chamber 242 during the micro-fracturing operation.

Figure 5:
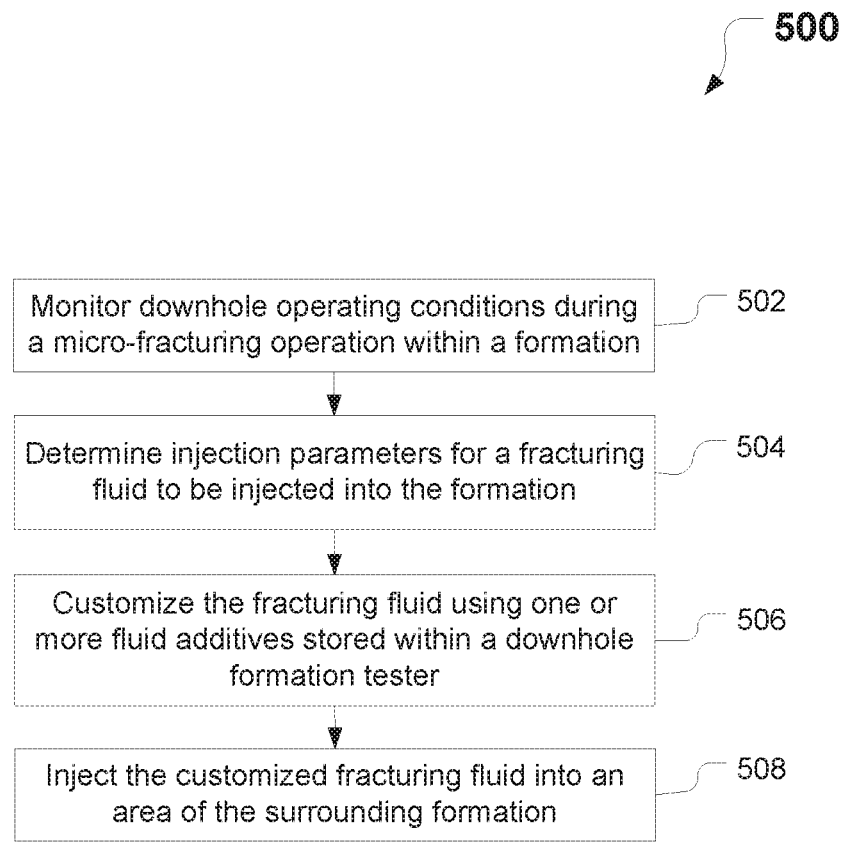
FIG. 5 is a flow chart of an illustrative process for downhole customization of fracturing fluids for real-time optimization of micro-fracturing operations within a subterranean formation.

FIG. 5 is a flowchart of an illustrative process 500 for downhole customization of fracturing fluids using a downhole formation tester so as to enable real-time optimization of micro-fracturing operations within a subterranean formation. For purposes of discussion and explanation, process 500 will be described in the context of well system 100 of FIG. 1, as described above, and downhole formation tester 114 of FIGS. 1 and 2, as described above. However, process 500 is not intended to be limited thereto. For example, process 500 may be performed by control system 120 of well system 100 that is located at a surface of the subsurface formation and communicatively coupled to downhole formation tester 114, as described above. However, it should be appreciated that process 500 is not intended to be limited thereto and that, in some implementations, process 500 may be performed by a control system of downhole formation tester 114, e.g., downhole controller section 200 of FIG. 2, as described above.

As shown in FIG. 5, process 500 may begin in block 502, which includes monitoring downhole operating conditions during a micro-fracturing operation being performed within a subterranean formation. As described above, such a micro-fracturing operation may be performed over different portions or depth intervals along a wellbore, e.g., wellbore 108 of FIG. 1, drilled within the formation. In one or more embodiments, the downhole operating conditions may be monitored based on downhole measurements of formation properties collected by one or more sensors of the downhole formation tester. In addition to sensor data, data from various other sources may be used in block 502 to monitor or determine operating conditions over the course of the micro-fracturing operation. Examples of such other data sources include, but are not limited to, measured formation properties from the same or similar depth interval of one or more nearby offset wells and calculated or estimated formation properties based on a simulation performed using a computer model of the formation. In one or more embodiments, the data used for the monitoring in block 502 may include downhole pressure fall-off measurements collected during a series of fluid injection tests performed along a portion of the wellbore, as described above.

In one or more embodiments, the downhole operating conditions may include one or more of a downhole temperature, a downhole pressure, a relative density difference between formation fluid and at least one of a drilling mud or a completion fluid, a contamination profile of the formation fluid and mud filtrate over time, a fracturing fluid efficiency, a downhole density of the fracturing fluid, a downhole viscosity of the fracturing fluid, a downhole concentration of the fracturing fluid, a fracture closure stress, an instantaneous shut-in pressure, and a leak-off coefficient of the fracturing fluid and/or one or more fluid additives used to customize the fracturing fluid, as will be described in further detail below. The fracture closure stress, shut-in pressure, and leak-off coefficient may be based on the pressure fall-off measurements collected during the series of fluid injection tests described above.

In block 504, the monitored downhole operating conditions are used to determine injection parameters for a fracturing fluid to be injected into the subterranean formation. Such injection parameters may include, for example and without limitation, a flow rate and a viscosity of the fracturing fluid to be injected into the subterranean formation. The fracturing fluid may be stored within a bulk storage chamber, e.g., bulk storage chamber 242 of fracturing fluid section 240, of the downhole formation tester, as described above.

Process 500 then proceeds to block 506, which includes customizing the fracturing fluid using one or more fluid additives stored within corresponding fluid storage chambers, e.g., fluid storage chambers 232 of fluid additive section 230, of the downhole formation tester, based on the injection parameters. Such fluid additives may include, but are not limited to, proppant, a breaker fluid, a friction reducer, an oxidizing agent, an acid, a corrosion inhibitor, an anti-bacterial agent, a scale inhibitor, a surfactant, a gelling agent, a crosslinker, a clay control agent, and a polymer. For example, the fracturing fluid may be a non-Newtonian fluid having a shear-dependent viscosity, and the customization may involve adjusting the fracturing fluid's viscosity at different points over the course of the micro-fracturing operation. The viscosity of the fracturing fluid in this example may be kept relatively high initially to keep any proppant particles suspended in the fracturing fluid. The viscosity may be lowered as the operation progresses, for example, in response to movement of the downhole formation tester to a predetermined depth or position within the wellbore that has been designated as an injection or entry point for injecting the fracturing fluid into an area of the subterranean formation to be fractured. In some implementations, the customization may involve mixing the fracturing fluid with a breaker fluid to transform the fracturing fluid from a gel state into more of a liquid state having a lower viscosity for injection.

In block 508, the customized fracturing fluid is injected into an area of the formation surrounding the portion of the wellbore. The fracturing fluid may be customized by varying a composition of the fracturing fluid using the one or more fluid additives. For example, a mixing chamber of the downhole formation tester may be used to mix a portion of the fracturing fluid from the bulk storage chamber with a predetermined amount of each of the one or more fluid additives from the corresponding fluid storage chambers. The mixing chamber may be, for example, a smaller chamber within the bulk storage chamber or a separate chamber within the fracturing fluid section or other section of the downhole formation tester. Additionally or alternatively, the fracturing fluid may be customized by selecting the fluid additive(s) to be injected into the area of the subterranean formation and controlling the injection of the customized fracturing fluid by varying a sequence in which the fracturing fluid and the selected fluid additive(s) are injected into the surrounding area of the subterranean formation.

In one or more embodiments, the fluid customization and injection operations in blocks 506 and 508, respectively, may be performed downhole based on signals transmitted from a computer system (e.g., control system 120) at the surface to a controller of the downhole formation tester, e.g., via a wireline or other communication pathway between the surface and downhole control systems. Alternatively, the customization, injection, and control thereof may be performed entirely downhole, e.g., as part of an automated control routine for adjusting the composition and properties of the fracturing fluid to be injected into the formation based on the downhole operating conditions at a given point in time during the micro-fracturing operation along the wellbore. In some implementations, the operations in blocks 506 and 508 may be performed iteratively, e.g., in a discrete or continuous fashion, based on continued pressure fall-off measurements resulting from the series of fluid injection tests performed in block 502, as described above.

Figure 6:
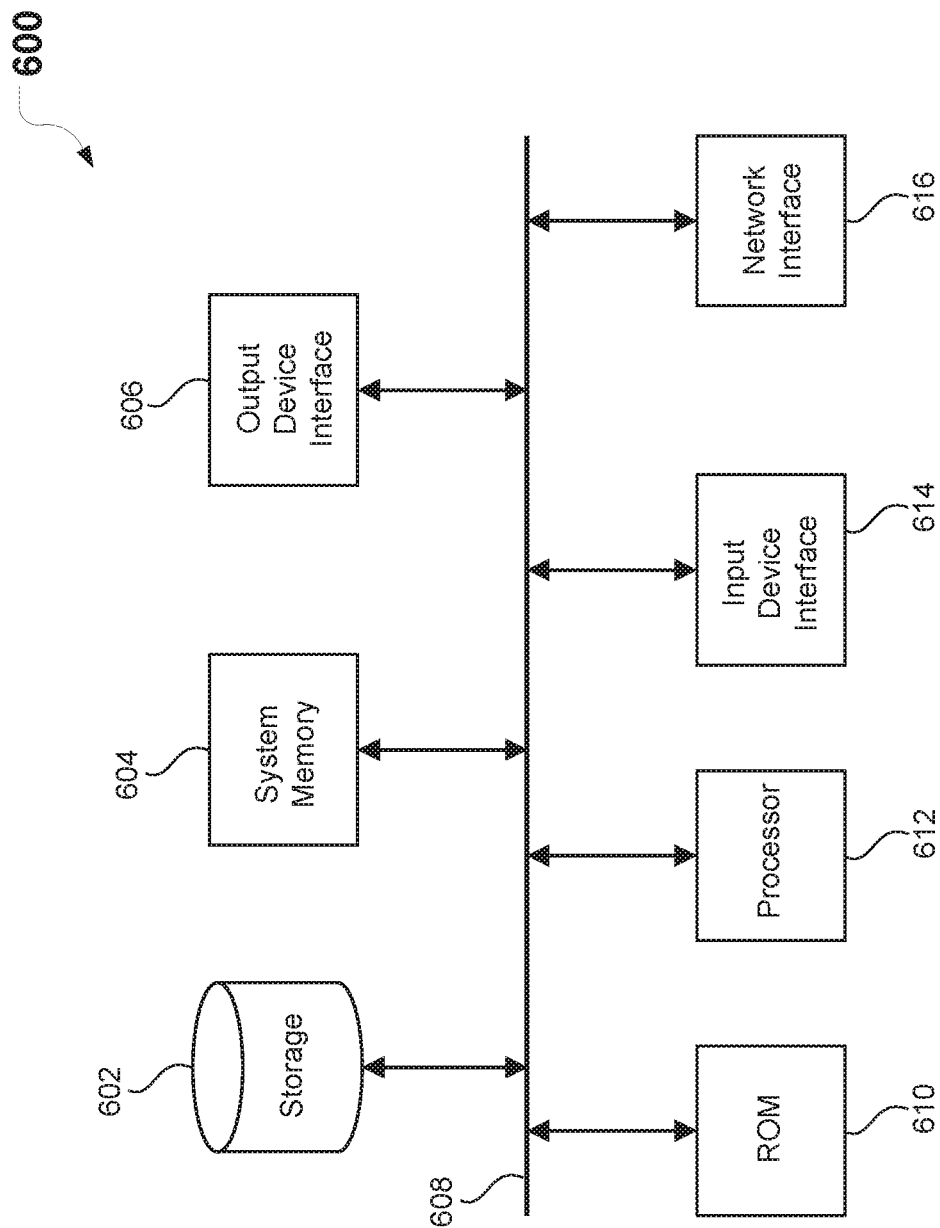
FIG. 6 is a block diagram of an illustrative computer system in which embodiments of the present disclosure may be implemented.

FIG. 6 is a block diagram of an exemplary computer system 600 in which embodiments of the present disclosure may be implemented. For example, control system 120 of FIG. 1, as described above, and process 500 of FIG. 5, as described above, may be implemented using system 600. System 600 can be a computer, phone, PDA, or any other type of electronic device. Such an electronic device includes various types of computer readable media and interfaces for various other types of computer readable media. As shown in FIG. 6, system 600 includes a permanent storage device 602, a system memory 604, an output device interface 606, a system communications bus 608, a read-only memory (ROM) 610, processing unit(s) 612, an input device interface 614, and a network interface 616.

Bus 608 collectively represents all system, peripheral, and chipset buses that communicatively connect the numerous internal devices of system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of system 600. Permanent storage device 602, on the other hand, is a read-and-write memory device. This device is a non-volatile memory unit that stores instructions and data even when system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for performing the downhole fluid customization techniques in accordance with embodiments of the present disclosure, e.g., according to process 500 of FIG. 5, as described above. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the system 600. Input devices used with input device interface 614 include, for example, alphanumeric, QWERTY, or T9 keyboards, microphones, and pointing devices (also called "cursor control devices"). Output device interfaces 606 enables, for example, the display of images generated by the system 600. Output devices used with output device interface 606 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 6, bus 608 also couples system 600 to a public or private network (not shown) or combination of networks through a network interface 616. Such a network may include, for example, a local area network ("LAN"), such as an Intranet, or a wide area network ("WAN"), such as the Internet. Any or all components of system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the operations associated with process 500 of FIG. 5, as described above, may be implemented using system 600 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for micro-fracturing and sampling in unconventional formations. The disclosed techniques for downhole customization and real-time optimization of fracturing fluid allows better control of the fracturing and subsequent sampling operation. Accordingly, advantages of the present disclosure include, but are not limited to, the ability to test different fracturing fluid formulations against a particular rock to determine the optimum operating conditions for the main hydraulic fracturing operations and also, reduce the amount of time needed to perform a micro-fracturing operation for obtaining a representative formation fluid sample.

As described above, a computer-implemented method of customizing fracturing fluids downhole for real-time optimization of micro-fracturing operations includes: monitoring, by a computer system, downhole operating conditions during a micro-fracturing operation along a portion of a wellbore within a subterranean formation, based on downhole measurements collected by sensors of a downhole formation tester communicatively coupled to the computer system and disposed within the wellbore; determining, by the computer system, injection parameters for a fracturing fluid to be injected from a bulk storage chamber of the downhole formation tester into the subterranean formation, based on the downhole operating conditions; transmitting, from the computer system to a controller of the downhole formation tester, signals for customizing the fracturing fluid using one or more fluid additives stored within corresponding fluid storage chambers of the downhole formation tester, based on the injection parameters; and controlling, by the computer system using control signals transmitted to the controller of the downhole formation tester during the micro-fracturing operation, injection of the customized fracturing fluid from the downhole formation tester into an area of the subterranean formation surrounding the portion of the wellbore. Also, as described above, a computer-readable storage medium having instructions stored therein, where the instructions, when executed by a processor, may cause the processor to perform a plurality of functions, including functions to: monitor downhole operating conditions during a micro-fracturing operation along a portion of a wellbore within a subterranean formation, based on downhole measurements collected by sensors of a downhole formation tester communicatively coupled to the computer system and disposed within the wellbore; determine injection parameters for a fracturing fluid to be injected from a bulk storage chamber of the downhole formation tester into the subterranean formation, based on the downhole operating conditions; transmit to a controller of the downhole formation tester, signals for customizing the fracturing fluid using one or more fluid additives stored within corresponding fluid storage chambers of the downhole formation tester, based on the injection parameters; and control, using control signals transmitted to the controller of the downhole formation tester during the micro-fracturing operation, injection of the customized fracturing fluid from the downhole formation tester into an area of the subterranean formation surrounding the portion of the wellbore.

The foregoing embodiments of the method or computer-readable storage medium may include any one or any combination of the following elements, features, functions, or operations: the downhole operating conditions may be selected from the group consisting of a downhole temperature, a downhole pressure, a relative density difference between formation fluid and at least one of a drilling mud or a completion fluid, a contamination profile of the formation fluid and mud filtrate over time, a fracturing fluid efficiency, a downhole density of the fracturing fluid, a downhole viscosity of the fracturing fluid, a downhole concentration of the fracturing fluid and a leak-off coefficient of at least one of the fracturing fluid or the one or more fluid additives; monitoring downhole operating conditions further comprises performing a series of fluid injection tests along the portion of the wellbore using at least one of the fracturing fluid, the one or more fluid additives or a drilling fluid in the wellbore, and the downhole operating conditions include a fracture closure stress and an instantaneous shut-in pressure based on pressure fall-off measurements collected during the series of fluid injection tests; the one or more fluid additives are selected from the group consisting of a proppant, a breaker fluid, a friction reducer, an oxidizing agent, an acid, a corrosion inhibitor, an anti-bacterial agent, a scale inhibitor, a surfactant, a gelling agent, a crosslinker, a salt, a clay control agent, and a polymer; the injection parameters of the fracturing fluid include a flow rate and a viscosity of the fracturing fluid to be injected into the area of the subterranean formation, and the fracturing fluid is customized by varying a composition of the fracturing fluid using the one or more fluid additives; the customization of the fracturing fluid includes mixing, within a mixing chamber of the downhole formation tester, a portion of the fracturing fluid from the bulk storage chamber with a predetermined amount of each of the one or more fluid additives from the corresponding fluid storage chambers; and the customization of the fracturing fluid includes selecting the one or more fluid additives to be injected into the area of the subterranean formation along with the fracturing fluid, and controlling the injection of the customized fracturing fluid includes varying a sequence in which the fracturing fluid and the one or more selected fluid additives are injected into the area of the subterranean formation.

Furthermore, as described above, a system including at least one processor and a memory coupled to the processor have been described, where the memory stores instructions, which, when executed by a processor, may cause the processor to perform a plurality of functions, including functions to: monitor downhole operating conditions during a micro-fracturing operation along a portion of a wellbore within a subterranean formation, based on downhole measurements collected by sensors of a downhole formation tester communicatively coupled to the computer system and disposed within the wellbore; determine injection parameters for a fracturing fluid to be injected from a bulk storage chamber of the downhole formation tester into the subterranean formation, based on the downhole operating conditions; transmit to a controller of the downhole formation tester, signals for customizing the fracturing fluid using one or more fluid additives stored within corresponding fluid storage chambers of the downhole formation tester, based on the injection parameters; and control, using control signals transmitted to the controller of the downhole formation tester during the micro-fracturing operation, injection of the customized fracturing fluid from the downhole formation tester into an area of the subterranean formation surrounding the portion of the wellbore.

One or more embodiments of the foregoing system may include any one or any combination of the following elements, features, functions, or operations: the downhole operating conditions may be selected from the group consisting of a downhole temperature, a downhole pressure, a relative density difference between formation fluid and at least one of a drilling mud or a completion fluid, a contamination profile of the formation fluid and mud filtrate over time, a fracturing fluid efficiency, a downhole density of the fracturing fluid, a downhole viscosity of the fracturing fluid, a downhole concentration of the fracturing fluid and a leak-off coefficient of at least one of the fracturing fluid or the one or more fluid additives; monitoring downhole operating conditions further comprises performing a series of fluid injection tests along the portion of the wellbore using at least one of the fracturing fluid, the one or more fluid additives or a drilling fluid in the wellbore, and the downhole operating conditions include a fracture closure stress and an instantaneous shut-in pressure based on pressure fall-off measurements collected during the series of fluid injection tests; the one or more fluid additives are selected from the group consisting of a proppant, a breaker fluid, a friction reducer, an oxidizing agent, an acid, a corrosion inhibitor, an anti-bacterial agent, a scale inhibitor, a surfactant, a gelling agent, a crosslinker, a salt, a clay control agent, and a polymer; the injection parameters of the fracturing fluid include a flow rate and a viscosity of the fracturing fluid to be injected into the area of the subterranean formation, and the fracturing fluid is customized by varying a composition of the fracturing fluid using the one or more fluid additives; the customization of the fracturing fluid includes mixing, within a mixing chamber of the downhole formation tester, a portion of the fracturing fluid from the bulk storage chamber with a predetermined amount of each of the one or more fluid additives from the corresponding fluid storage chambers; and the customization of the fracturing fluid includes selecting the one or more fluid additives to be injected into the area of the subterranean formation along with the fracturing fluid, and controlling the injection of the customized fracturing fluid includes varying a sequence in which the fracturing fluid and the one or more selected fluid additives are injected into the area of the subterranean formation.

While specific details about the above embodiments have been described, the above hardware and software descriptions are intended merely as example embodiments and are not intended to limit the structure or implementation of the disclosed embodiments. For instance, although many other internal components of the system 600 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of customizing fracturing fluids downhole for real-time optimization of micro-fracturing operations, the method comprising:
    monitoring, by a computer system, downhole operating conditions during a micro-fracturing operation along a portion of a wellbore within a subterranean formation, based on downhole measurements collected by sensors of a downhole formation tester communicatively coupled to the computer system and disposed within the wellbore;
    determining, by the computer system, injection parameters for a fracturing fluid to be injected from a bulk storage chamber of the downhole formation tester into the subterranean formation, based on the downhole operating conditions;
    transmitting, from the computer system to a controller of the downhole formation tester, signals for customizing the fracturing fluid using one or more fluid additives stored within corresponding fluid storage chambers of the downhole formation tester, based on the injection parameters; and
    controlling, by the computer system using control signals transmitted to the controller of the downhole formation tester during the micro-fracturing operation, injection of the customized fracturing fluid from the downhole formation tester into an area of the subterranean formation surrounding the portion of the wellbore.

2. The method of claim 1, wherein the downhole operating conditions are selected from the group consisting of: a downhole temperature; a downhole pressure; a relative density difference between formation fluid and at least one of a drilling mud or a completion fluid; a contamination profile of the formation fluid and mud filtrate over time; a fracturing fluid efficiency; a downhole density of the fracturing fluid; a downhole viscosity of the fracturing fluid; a downhole concentration of the fracturing fluid; and a leak-off coefficient of at least one of the fracturing fluid or the one or more fluid additives.

3. The method of claim 1,
    wherein monitoring downhole operating conditions further comprises:
        performing a series of fluid injection tests along the portion of the wellbore using at least one of the fracturing fluid, the one or more fluid additives or a drilling fluid in the wellbore, and
    wherein the downhole operating conditions include a fracture closure stress and an instantaneous shut-in pressure based on pressure fall-off measurements collected during the series of fluid injection tests.

4. The method of claim 1, wherein the one or more fluid additives are selected from the group consisting of: proppant; a breaker fluid; a friction reducer; an oxidizing agent; an acid; a corrosion inhibitor; an anti-bacterial agent; a scale inhibitor; a surfactant; a gelling agent; a crosslinker; a salt; a clay control agent; and a polymer.

5. The method of claim 1, wherein the injection parameters of the fracturing fluid include a flow rate and a viscosity of the fracturing fluid to be injected into the area of the subterranean formation, and the fracturing fluid is customized by varying a composition of the fracturing fluid using the one or more fluid additives.

6. The method of claim 1, wherein the customization of the fracturing fluid includes mixing, within a mixing chamber of the downhole formation tester, a portion of the fracturing fluid from the bulk storage chamber with a predetermined amount of each of the one or more fluid additives from the corresponding fluid storage chambers.

7. The method of claim 1, wherein the customization of the fracturing fluid includes selecting the one or more fluid additives to be injected into the area of the subterranean formation along with the fracturing fluid, and controlling the injection of the customized fracturing fluid includes varying a sequence in which the fracturing fluid and the one or more selected fluid additives are injected into the area of the subterranean formation.

8. A system for real-time optimization of micro-fracturing operations, the system comprising:
    at least one processor; and
    a memory coupled to the processor having instructions stored therein, which when executed by the processor, cause the processor to perform functions including functions to:
    monitor downhole operating conditions during a micro-fracturing operation along a portion of a wellbore within a subterranean formation, based on downhole measurements collected by sensors of a downhole formation tester communicatively coupled to the computer system and disposed within the wellbore;
    determine injection parameters for a fracturing fluid to be injected from a bulk storage chamber of the downhole formation tester into the subterranean formation, based on the downhole operating conditions;
    transmit to a controller of the downhole formation tester, signals for customizing the fracturing fluid using one or more fluid additives stored within corresponding fluid storage chambers of the downhole formation tester, based on the injection parameters; and
    control, using control signals transmitted to the controller of the downhole formation tester during the micro-fracturing operation, injection of the customized fracturing fluid from the downhole formation tester into an area of the subterranean formation surrounding the portion of the wellbore.

9. The system of claim 8, wherein the downhole operating conditions are selected from the group consisting of: a downhole temperature; a downhole pressure; a relative density difference between formation fluid and at least one of a drilling mud or a completion fluid; a contamination profile of the formation fluid and mud filtrate over time; a fracturing fluid efficiency; a downhole density of the fracturing fluid; a downhole viscosity of the fracturing fluid; a downhole concentration of the fracturing fluid; and a leak-off coefficient of at least one of the fracturing fluid or the one or more fluid additives.

10. The system of claim 8,
    wherein the functions performed by the processor further include functions to perform a series of fluid injection tests along the portion of the wellbore using at least one of the fracturing fluid, the one or more fluid additives or a drilling fluid in the wellbore, and wherein the downhole operating conditions include a fracture closure stress and an instantaneous shut-in pressure based on pressure fall-off measurements collected during the series of fluid injection tests.

11. The system of claim 8, wherein the one or more fluid additives are selected from the group consisting of: proppant; a breaker fluid; a friction reducer; an oxidizing agent; an acid; a corrosion inhibitor; an anti-bacterial agent; a scale inhibitor; a surfactant; a gelling agent; a crosslinker; a salt; a clay control agent; and a polymer.

12. The system of claim 8, wherein the injection parameters of the fracturing fluid include a flow rate and a viscosity of the fracturing fluid to be injected into the area of the subterranean formation, and the fracturing fluid is customized by varying a composition of the fracturing fluid using the one or more fluid additives.

13. The system of claim 8, wherein the customization of the fracturing fluid includes mixing, within a mixing chamber of the downhole formation tester, a portion of the fracturing fluid from the bulk storage chamber with a predetermined amount of each of the one or more fluid additives from the corresponding fluid storage chambers.

14. The system of claim 8, wherein the customization of the fracturing fluid includes selecting the one or more fluid additives to be injected into the area of the subterranean formation along with the fracturing fluid, and the injection of the customized fracturing fluid is controlled by varying a sequence in which the fracturing fluid and the one or more selected fluid additives are injected into the area of the subterranean formation.

15. A computer-readable storage medium having instructions stored therein, which when executed by a computer cause the computer to perform a plurality of functions, including functions to:

monitor downhole operating conditions during a microfracturing operation along a portion of a wellbore within a subterranean formation, based on downhole measurements collected by sensors of a downhole formation tester communicatively coupled to the computer system and disposed within the wellbore;

determine injection parameters for a fracturing fluid to be injected from a bulk storage chamber of the downhole formation tester into the subterranean formation, based on the downhole operating conditions;

transmit to a controller of the downhole formation tester, signals for customizing the fracturing fluid using one or more fluid additives stored within corresponding fluid storage chambers of the downhole formation tester, based on the injection parameters; and control, using control signals transmitted to the controller of the downhole formation tester during the microfracturing operation, injection of the customized fracturing fluid from the downhole formation tester into an area of the subterranean formation surrounding the portion of the wellbore.

16. The computer-readable storage medium of claim 15, wherein the downhole operating conditions are selected from the group consisting of: a downhole temperature; a downhole pressure; a relative density difference between formation fluid and at least one of a drilling mud or a completion fluid; a contamination profile of the formation fluid and mud filtrate over time; a fracturing fluid efficiency; a downhole density of the fracturing fluid; a downhole viscosity of the fracturing fluid; a downhole concentration of the fracturing fluid; and a leak-off coefficient of at least one of the fracturing fluid or the one or more fluid additives.

17. The computer-readable storage medium of claim 15, wherein the functions performed by the computer further include functions to perform a series of fluid injection tests along the portion of the wellbore using at least one of the fracturing fluid, the one or more fluid additives or a drilling fluid in the wellbore, and wherein the downhole operating conditions include a fracture closure stress and an instantaneous shut-in pressure based on pressure fall-off measurements collected during the series of fluid injection tests.

18. The computer-readable storage medium of claim 15, wherein the one or more fluid additives are selected from the group consisting of: proppant; a breaker fluid; a friction reducer; an oxidizing agent; an acid; a corrosion inhibitor; an anti-bacterial agent; a scale inhibitor; a surfactant; a gelling agent; a crosslinker; a salt; a clay control agent; and a polymer.

19. The computer-readable storage medium of claim 15, wherein the injection parameters of the fracturing fluid include a flow rate and a viscosity of the fracturing fluid to be injected into the area of the subterranean formation, and the fracturing fluid is customized by varying a composition of the fracturing fluid using the one or more fluid additives.

20. The computer-readable storage medium of claim 15, wherein the customization of the fracturing fluid includes mixing, within a mixing chamber of the downhole formation tester, a portion of the fracturing fluid from the bulk storage chamber with a predetermined amount of each of the one or more fluid additives from the corresponding fluid storage chambers.

* * * * *